United States Patent
Raynor

(10) Patent No.: US 9,635,162 B2
(45) Date of Patent: Apr. 25, 2017

(54) ELECTRONIC DEVICES

(75) Inventor: Jeffrey Raynor, Edinburgh (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 938 days.

(21) Appl. No.: 12/964,112

(22) Filed: Dec. 9, 2010

(65) Prior Publication Data
US 2011/0134033 A1    Jun. 9, 2011

(30) Foreign Application Priority Data

Dec. 9, 2009 (GB) .................................. 0921527.8

(51) Int. Cl.
| | |
|---|---|
| G06F 3/041 | (2006.01) |
| H04M 1/725 | (2006.01) |
| G06F 3/0354 | (2013.01) |
| H04M 1/23 | (2006.01) |

(52) U.S. Cl.
CPC ...... *H04M 1/7253* (2013.01); *G06F 3/03543* (2013.01); *G06F 3/03547* (2013.01); *H04M 1/233* (2013.01); *H04M 2250/02* (2013.01); *H04M 2250/12* (2013.01); *H04M 2250/52* (2013.01)

(58) Field of Classification Search
CPC .......................... G06F 3/03543; G06F 3/03547
USPC ................................................. 345/157, 167
See application file for complete search history.

(56) References Cited

U.S. PATENT DOCUMENTS

| | | | | |
|---|---|---|---|---|
| 4,364,035 | A  * | 12/1982 | Kirsch ........................ | 345/166 |
| 5,805,144 | A  * | 9/1998 | Scholder et al. ............ | 345/163 |
| 5,943,625 | A | 8/1999 | Yeom et al. .................. | 455/557 |
| 7,071,922 | B2 * | 7/2006 | Sun et al. ..................... | 345/166 |
| 7,098,890 | B2 * | 8/2006 | Ho et al. ...................... | 345/157 |
| 7,696,985 | B2 * | 4/2010 | Machida ....................... | 345/169 |
| 2002/0030668 | A1 * | 3/2002 | Hoshino et al. ............. | 345/175 |
| 2004/0189609 | A1 | 9/2004 | Estes et al. ................... | 345/169 |
| 2005/0273533 | A1 | 12/2005 | Hughes ......................... | 710/62 |
| 2006/0040712 | A1 | 2/2006 | Ansari et al. ................. | 455/566 |
| 2008/0030470 | A1 * | 2/2008 | Rensberger et al. ........ | 345/163 |

FOREIGN PATENT DOCUMENTS

| | | | |
|---|---|---|---|
| CN | 201355838 Y | 12/2008 | |
| GB | 2 377 592 | 1/2003 | ............. G06F 1/16 |
| GB | 2 416 825 | 2/2006 | ............. G06F 3/033 |
| WO | 2009/101490 | 8/2009 | ............. H04M 1/725 |

* cited by examiner

*Primary Examiner* — Towfiq Elahi
(74) *Attorney, Agent, or Firm* — Slater Matsil, LLP

(57) ABSTRACT

A mobile communications device includes an antenna, a navigation pad and a signal processor. The antenna, navigation pad, and signal processor cooperate to encode and transmit motion signals from the navigation pad to a computer so that the mobile communications device functions as a pointing device for the computer.

26 Claims, 3 Drawing Sheets

ELECTRONIC DEVICES

FIELD OF THE INVENTION

The present disclosure relates to improvements in electronic devices, and, in particular, to extended functionality for mobile communications devices.

BACKGROUND OF THE INVENTION

A pointing device is an apparatus that a user manipulates in order to interact with a computer. The manipulation of the device is translated into movement of a cursor or pointer on a display screen of a computer, and interactive elements are provided on the pointing device for the input of various commands. Pointing devices include track balls, touch pads and joysticks, however, by far the most popular pointing device for use in a computing environment is the "mouse." A computer mouse is moved over a mousing surface, the movement being translated into commands sent to a computer to move a displayed cursor or pointer in correspondence with the movement.

There are various technologies for encoding the movement of the mouse. One technology is the use of a track ball, together with rollers and encoders, so that physical motion of the track ball in the mouse rotates the rollers and outputs an encoded signal representative of the motion.

Recently, optical mice have become popular. An optical mouse comprises an illumination source within the body of the mouse, together with an image sensor. The illumination source shines onto a mousing surface and the image sensor is arranged to receive light reflected from the surface. Image processing software detects differences in successive frames of images collected by the image sensor and uses these differences to construct a motion signal to send to the computer for moving the cursor or pointer in correspondence with the motion of the mouse. The illumination source typically comprises a light emitting diode (LED), however it may also include an infrared laser diode or other suitable illumination means.

A computer mouse can communicate with a computer either through a wired or a wireless connection. Early wired connections use RS-232C or PS/2 connections while later wired mice tend to use a USB connector. Various other communication protocols are known and can be used for connecting a wired mouse to a computer. Wireless mice transmit their data via a radio frequency link to the computer. In most cases a radio frequency receiver is provided in a dongle which connects to a computer, typically via its USB port. This receiver then, detects the signals transmitted by a transmitter within the body of the mouse. In some cases the wireless receiver can be incorporated within the body of the computer. One example type of radio frequency communication that can be employed is bluetooth. A computer will normally have the components of the bluetooth stack within its body, although a separate bluetooth dongle can be provided.

Laptop computers are provided typically with touch pad pointing devices, however these can be cumbersome to use, and people may still prefer to use a stand alone mouse. However, for the business traveller it may be inconvenient to carry an additional device, particularly if that device requires an additional receiver or has a messy cable. The additional receiver can be dispensed with if the mouse has a bluetooth transmitter and if the laptop is provided with an integrated bluetooth receiver, however, adding the bluetooth functionality to a mouse can significantly increase the cost of the mouse as the bluetooth protocol is relatively complex compared with the standard mousing circuitry.

A mobile communication device in the context of this disclosure refers to any portable device that has a communications capability, for example a mobile telephone, personal digital assistant or equivalent. The present discussion will focus mainly on mobile telephones, although it will be appreciated that throughout the description references to mobile telephones could equally refer to any other type of mobile communications device.

Mobile telephones are provided with navigation pads for manipulating the focus of a cursor or a pointer on the display screen of a mobile telephone. Navigation pads in early mobile telephones comprise directional buttons or paddles for movement of a cursor in right, left, up and down directions.

Various mobile telephones are also available with a trackball navigation pad. A trackball uses mechanical encoders to translate the motion of the ball into motion of the cursor or pointer on the display screen of the mobile device.

Mobile telephones can also be provided with touch pads which translate the motion of a finger over the pad into motion of a cursor on screen. One type of touch pad is a capacitive touch pad, which uses the connection to ground caused by the contact of a finger with the pad as a means of determining a position of the finger. It is also known to provide touch pads that work using optical methods. These optical touch pads are known colloquially as finger mice. As for an optical computer mouse, an illumination source is provided and an image sensor are provided. In a finger mouse, the illumination source shines upwards from the body of the mobile telephone onto an underside surface of the touch pad. The image sensor detects light reflected from the underside of the touch pad. As a finger is moved over the touch pad image analysis is carried out to detect motion and translate that to movement of a cursor or a point on the display screen of the mobile device.

The image analysis could detect the relative position of a finger as it moves across the pad, or it could detect the relative position of ridges of skin of the finger as it moves, or of features of other items, for example a glove.

A business traveller may typically carry a laptop computer as well as a mobile telephone. They are then faced with the problem of carrying an extra device if they wish to use a pointing device for the laptop other than the touchpad which is provided. This is inconvenient and troublesome.

SUMMARY OF THE INVENTION

According to a first aspect of the present invention there is a mobile communications device comprising a radio frequency antenna, a navigation pad and a signal processor, together arranged to encode and transmit motion signals from the navigation pad to a computer so that the mobile communications device functions as a computer pointing device.

Optionally the navigation pad is shaped so that it sits proud of a front surface of the mobile communications device. The navigation pad advantageously protrudes further from the front surface than any other component of the mobile communications device.

Optionally, a low friction protrusion is provided at one end of the mobile communications device and is sized such that the low friction protrusion and the navigation pad are the two points of contact on a surface when the mobile communications device is placed faced down on a mousing surface.

Optionally the center of gravity of the mobile communications device is between the low friction protrusion and the navigation pad. Optionally, the navigation pad is provided with a click function so that pressure on the navigation pad results in a mouse click.

Optionally the mobile communications device is further provided with switch elements for the input of mousing commands. Optionally, the switch elements comprise micro switches or cherry switches. Alternatively, they may comprise touch pad pressure sensitive switches which can be tapped in order to initiate commands.

The switches may be provided on a reverse surface of the mobile communications device, on one or more of the side surfaces of the mobile communications device, or both. Optionally, the navigation pad is a mechanical trackball.

Optionally, the navigation pad is at least partially transparent to radiation emitted from an illumination source housed within the body of the mobile communications device and may provide an optical mouse type function.

Optionally, the mechanical trackball signals can be used for navigation of a cursor on the display of a mobile communications device and the optical mouse type function can be used for mousing signals for transmission to the computer.

Alternatively, the navigation pad comprises a domed optical touchpad. Optionally the operation of the navigation pad is switchable between a first mode for a cell phone function and a second mode for a mousing function.

Optionally, the mobile communications device comprises control software that reverses the sign of an upwards and downwards option of the navigation pad when the phone is switched between the two different modes. Optionally, the mode selection is achieved by means of a menu selection in an application or operating system of the mobile communications device.

Optionally, the mobile communications device is provided with a MEMS sensor or similar to detect the orientation of the phone, and the mode selection is carried out based on said orientation. Optionally, the mobile communications device is provided with a light detector and the selection of the mode of operation is chosen based upon the level of ambient light detected.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

Figure 1:
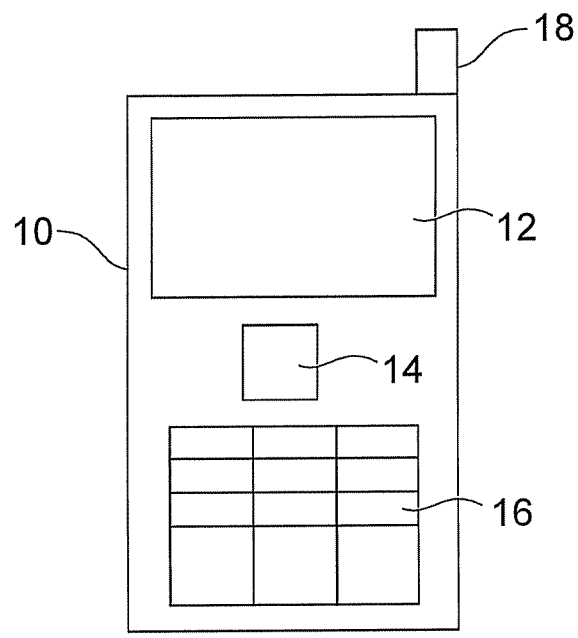
FIG. 1 illustrates a prior art mobile communications device.

In its broadest sense the present invention provides for a mobile communications device that can also function as an optical pointing device. FIG. 1 shows a mobile telephone 10 according to the prior art. FIG. 1 is a representative diagram and shows selected components for the purposes of illustration. The mobile telephone 10 comprises a display screen 12, navigation pad 14 and keypad 16. A communications aerial 18 is provided for wireless communication of voice and other data. Antenna 18 operates in the ultra high frequency (UHF) range for the communication of this type of data. For example a "quad-band" GSM phone may be capable of switching between frequency bands of 850, 900, 1800 and 1900 MHz. The operation frequency of a communications antenna may depend upon the type of network and country in which the mobile telephone is to be operated in.

It will also be appreciated that the form of the mobile telephone illustrated in FIG. 1 is for illustration purposes only and different form factors and keypad layouts can be provided. The scope of this disclosure encompasses all types of mobile telephones, including clamshells, as well as all designs of other mobile communications devices.

As mentioned above the navigation pad 14 may take many different forms, including for example directional buttons that are pressed, a trackballs, a capacitive touchpad or a finger mouse optical touchpad. The present disclosure enables a mobile communications device to be used as an optical pointing device by including a processor in the mobile telephone that encodes the motion of the navigation pad to cursor motion signals, together with a transmitter for transmitting the cursor motion signals to a receiver, which may be an integral part of a computer, or housed within a dongle which itself then communicates with the computer.

The communication of the motion signals for mousing may be made outside of the UHF band or at least outside of those ranges typically used for standard communications. As such, the mobile telephone can be provided with an antenna suitable to transmit the data at a second frequency different from the frequency or frequencies used for communication of voice or other data as used in "normal" operation of the mobile telephone. The communication frequencies used can correspond to the frequencies normally used for standard mice. For example, 27 MHz or newer generation 2.4 GHz such as used by the bluetooth protocol which is one example of a radio frequency communication protocol for use with the present disclosure.

There are two possible implementation options for achieving this within the body of a mobile communications device. The first option uses the same physical antenna for transmission of both the UHF signals for GSM communication and the secondary alternative radio frequency signals for the signals from a mouse. The same antenna can be driven by two separate drive circuits.

An alternative implementation would be to provide a second independent antenna dedicated for use for transmission of the mousing signals. The choice of implementation will depend upon the particular antenna used in the mobile device. Note that the antenna 18 in FIG. 1 is illustrated as a separate stand alone component, however in the vast majority of mobile telephones the antenna will be not visible in this way and will be housed within the body of the device.

Figure 2:
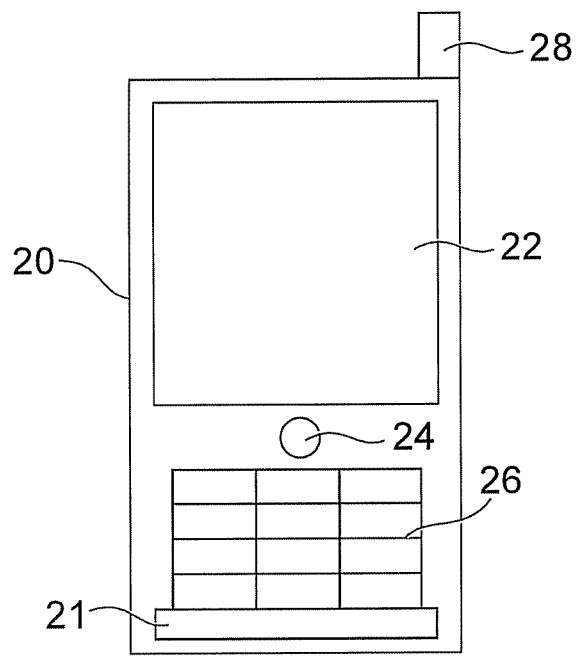
FIG. 2 illustrates a mobile communications device according to an embodiment of the present disclosure.

FIG. 2 shows an embodiment where a mobile communications device 20 is provided with a display screen 22, a navigation pad 24, keypad 26 and an antenna 28. The communications device 20 is also optionally provided with a protrusion 21, which will be discussed later. The antenna 28 may be a single antenna or may comprise two sub antennas as described above.

In one embodiment, the track pad 24 can comprise a standard trackball device using mechanical encoders or other means, or devices, such as magnets and hall-effect switches for use in a Blackberry® mobile telephone. This embodiment is simple to implement, but does pose some technical challenges because of the different mechanical requirements for a trackball as compared with those of a mouse. The surface or a trackball should be relatively smooth for operation in the standard mobile phone implementation so that it feels good for the finger and also enables smooth operation of the encoding rollers. In contrast, for a mouse the surface should be rough and somewhat sticky so that it makes good contact with the mousing surface. If it looses adhesion the positional data will be inaccurate. The conflicting mechanical requirements make it difficult to produce a trackball that is optimised for use both by a finger in operation of a mobile phone mode and by motion over a surface in a mousing mode.

One approach would be to provide a hybrid device comprising a trackball that is at least partially transparent and that operates in a standard fashion using mechanical encoders for use in a mobile telephone mode. Additionally, an illumination source and an image sensor could also be provided so that the trackball could be operated as an optical mouse in a mousing operation.

The frequency of the illumination and the material of the trackball could be chosen so that an image sensor detects differences in successive image frames of the underlying mousing surface, rather than the underside surface of the trackball. The trackball data can be used for changing the focus of a pointer or cursor on the mobile telephone screen, and the data from the optical sensor can be used for generation of the mouse data. Switching circuitry or means can be provided to switch between the two data sources, or both could be kept on as they are used for different purposes.

However, in a preferred embodiment the navigation pad 24 can comprise a domed optical touch pad (a so-called finger mouse touch pad). This shape is in contrast to existing optical touch pads on mobile communications devices which tend to be flat and recessed and therefore may not make a reliable contact with the surface for use in the mouse mode.

The output from the navigation pad 24 can be switched between mobile phone navigation and mouse navigation depending on how the device 20 is being used. Alternatively, switching can be absent and both modes of operation can be used simultaneously. In mousing mode, the mobile telephone is used face down and so it does not matter to the user if the mobile telephone's on-screen cursor is moving at the same time as the cursor or pointer on the screen of a laptop. Similarly, it does not matter to a user if the laptop's on-screen cursor moves while they operate the mobile telephone for standard uses.

In contrast to a trackball, the domed surface of the finger mouse touch pad does not move, and thus it is suitable both for the standard finger mousing and also for optical mouse operations.

The shape of the optical element forming the finger mouse surface may be designed to optimise the image sensing function for both operations, i.e. mousing and regular mobile telephone operation. In order to operate effectively as a mouse, the domed navigation pad 24 makes contact with the mousing surface when the phone is used in a mousing mode. In a preferred embodiment the domed navigation pad 24 protrudes further from the front surface of the mobile device than any other components.

Figure 3:
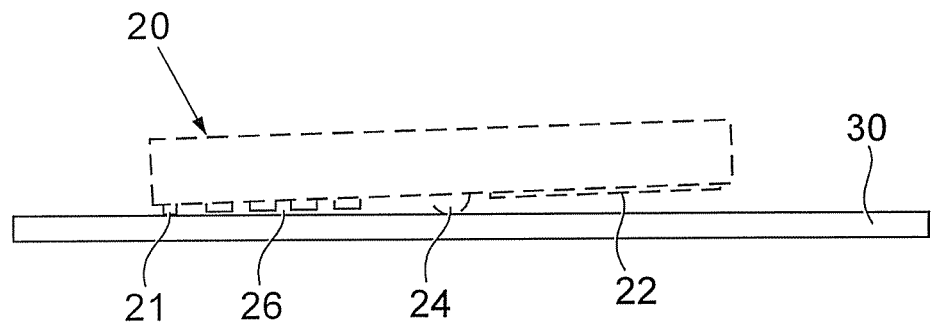
FIG. 3 shows a side view of the mobile communications device of FIG. 2 used in a mousing mode.

This is illustrated in FIG. 3 which shows the use of a mobile communications device 20 on a mousing surface 30. The mousing surface 30 may for example be a desk or a mouse mat. It can be seen that the navigation pad 24 protrudes further than any other components from the front surface of the device 20. In particular, the keys 26 and screen 22 should be prevented from having contact with the mousing surface 30. In use as a pointing device, the mobile telephone 20 is moved along the surface of the mousing surface 30 by a user performing a pointing operation. Note that the aerial 28 illustrated in FIG. 2 is not shown in FIG. 3 for the purpose of clarity of illustration.

The device 20 is preferably provided with a low friction protrusion 21. This serves to help ensure that the keys 26 or other components do not contact the mousing surface 30 and is formed from a suitable material to help the device 20 move smoothly over the mousing surface 30. An example material that could be used would be Teflon®.

The center of gravity of the phone is also preferably arranged to be between the protrusion 21 and the navigation pad 24. This could be achieved by appropriate weighting of the pad 21 or by arrangement of other components within the mobile telephone. This ensures that the mobile telephone 20 naturally sits in the position shown in FIG. 3 when no external forces are applied except for gravity and the counteracting force of the mousing surface 30.

Figure 4:
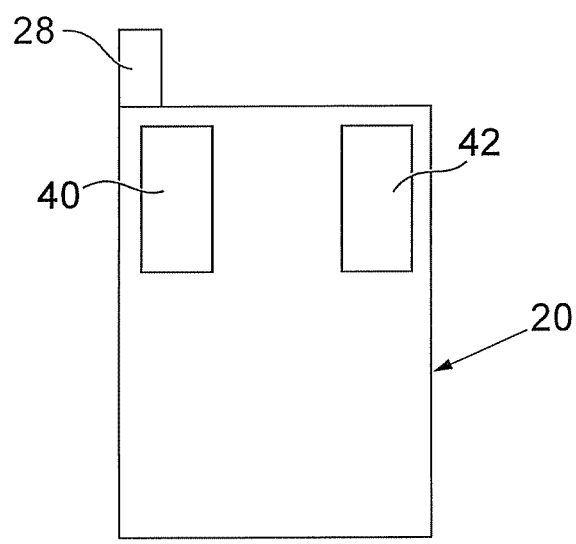
FIG. 4 shows a reverse surface of the mobile communications device shown in FIGS. 2 and 3.

FIG. 4 shows a view of a reverse surface of the device 20, in which mouse buttons 40 and 42 are provided. These mouse buttons may be standard cherry switches which use a metal strip which bends under pressure to actuate the switch. Alternatively, the buttons 40, 42 may comprise pressure sensitive touch pads that can be tapped or double tapped in order to provide input. Buttons and/or other input mechanisms may also be provided at the side surfaces of the mobile device and it is also to be appreciated that additional buttons and/or other input mechanisms may be provided. In addition, elements such as scroll wheels may be provided. Advantageously, a scroll wheel might be provided at the side of the device. The scroll wheel may be a completely new component, or a second (mousing) functionality could be provided for an existing component.

Figure 5:
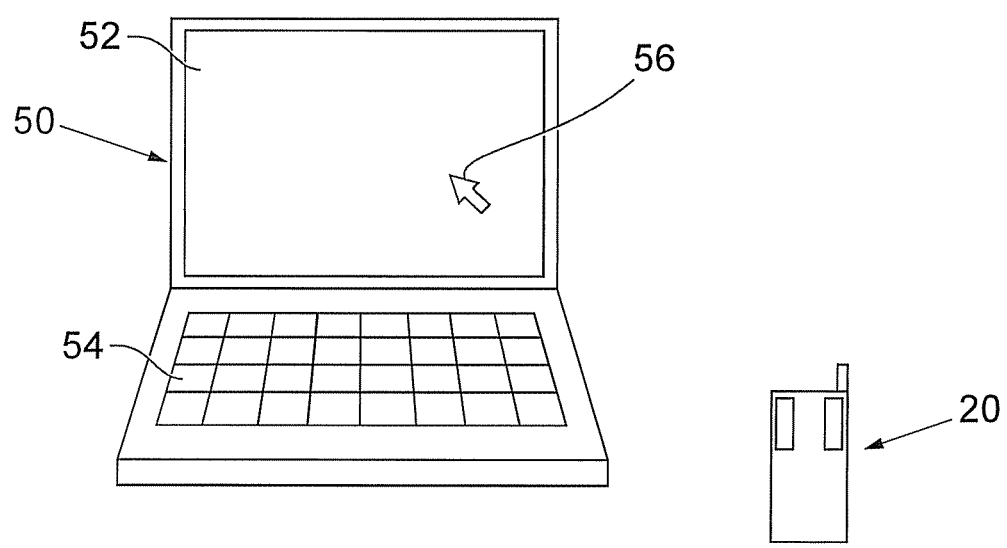
FIG. 5 shows the mobile communications device of FIGS. 2-4 in use as an optical pointing device.

FIG. 5 shows the device 20 in operation with a laptop computer 50. The laptop computer comprises a display screen 52 and keyboard 54. The device 20 is used to control the position of a cursor 56 on the screen 52 of the laptop 50.

When not being used for making or receiving telephone calls a mobile telephone is typically held in a user's hand in the orientation shown in FIGS. 1 and 2. According to this disclosure the mobile telephone can be used as a pointing device in any orientation where it is placed faced down on a mousing surface. It is possible for the mobile device as shown in FIGS. 1 and 2 to be (1) flipped upside down along a axis of symmetry running from top to bottom along the body of the mobile phone, and then (2) to be rotated back to front, by 180 degrees around an axis passing through the centre of the mobile phone perpendicular to the face of the face of the device and to the page of the figures. In this way, an upwards motion of the navigation pad 24 in a mobile telephone mode will correspond to an upwards motion in a mouse mode.

However, it is more intuitive for a user simply to pick up a mobile device in the orientation shown in FIGS. 1 and 2 and to simply flip it as described in step (1) above and use the mobile telephone in that orientation. In this orientation, the protrusion 21 should be positioned as shown in FIGS. 2 and 3.

When the mobile telephone is used in this way, the up or down direction of motion of the cursor for a given up or down direction of motion of the navigation pad will be different based upon whether the device is used in a mobile telephone mode or in a mouse mode. To counteract this, the mobile communication device can be provided with software that switches the sense of the navigational signal in an upwards and downwards direction based upon the mode of operation.

The mode of operation can be chosen via a selection in the telephone's operating system, or it can be automatically detected. Methods of automatically detecting the mode of operation could comprise providing the device with a MEMS sensor, for example a gyroscope or similar, to detect the orientation of the telephone. An alternative embodiment would be to use the optical mouse sensor as an ambient light detector. The illumination source for the mouse navigation could be disabled and the data from the pixels of the mouse sensor could be averaged to provide a level of the ambient light. Averaging (or any other suitable function) could be applied. If the light level is higher than a predetermined threshold the device can be determined as being used in a mobile phone mode, whereas if the light level is below that predetermined threshold the device can be determined as being used in a mouse mode. The switching of the navigation signals can then be made appropriately.

Various improvements and modifications can be made to the above without departing from the scope of the invention.

That which is claimed:

1. A mobile communications device configured to operate in a device mode and operate as a pointing device in a mouse mode for a computer, and comprising:
    a housing;
    a display carried by a front surface of said housing;
    a keypad carried by a front surface of said housing;
    a low friction projection positioned on the front surface of said housing at an end opposite said display, said low friction projection protruding outwardly therefrom farther than said keypad to inhibit the keypad from contacting a mouse surface during use of the mobile communications device with the front surface down in the mouse mode;
    a navigation pad carried by the front surface of said housing and protruding outwardly therefrom farther than said keypad and said low friction projection, and configured to selectively operate as a device pointer during contact with a finger in the device mode, and as a computer pointer during contact with the mouse surface in the mouse mode;
    an antenna carried by said housing; and
    a signal processor carried by said housing and configured to
        detect motion of the mobile communications device in the mouse mode via said navigation pad in contact with the mouse surface and encode motion signals based thereupon, and
        transmit the encoded motion signals to the computer via said antenna.

2. The mobile communications device of claim 1, wherein a mobile device center of gravity is between said low friction projection and said navigation pad.

3. The mobile communications device of claim 1, wherein said navigation pad is configured to detect pressure applied thereto; and wherein said signal processor encodes a mouse click signal based upon the detected pressure and transmits the mouse click signal to the computer.

4. The mobile communications device of claim 1, further comprising at least one switch element carried by said housing and coupled to said signal processor to receive mousing commands.

5. The mobile communications device of claim 4, wherein said at least one switch element comprises at least one of a micro switch and a snap action switch.

6. The mobile communications device of claim 4, wherein said at least one switch element comprises a touch pad coupled to said signal processor; and wherein said signal processor encodes a mouse command signal based upon detected pressure applied to said touch pad, and transmits the mouse command signal to the computer.

7. The mobile communications device of claim 4, wherein said at least one switch element is positioned on a rear surface of said housing.

8. The mobile communications device of claim 4, wherein said at least one switch element is positioned on a side surface of said housing.

9. The mobile communications device of claim 4, wherein said at least one switch element comprises a plurality of switch elements, with at least some switch elements of said plurality thereof being positioned on a rear surface of said housing, and with at least other switch elements of said plurality thereof being positioned on a side surface of said housing.

10. The mobile communications device of claim 1, wherein said navigation pad comprises a mechanical trackball.

11. The mobile communications device of claim 10, wherein said mechanical trackball is at least partially transparent; further comprising an illumination source carried by said housing; and wherein said mechanical trackball and said illumination source cooperate to function as an optical mouse.

12. The mobile communications device of claim 1, wherein said navigation pad comprises a domed optical touchpad.

13. The mobile communications device of claim 1, wherein said signal processor encodes and transmits the motion signals in the mouse mode, and is also configured to perform cellular telephone functions based upon the motion signals in the device mode defined as a cellular telephone mode.

14. The mobile communications device of claim 13, wherein said signal processor reverses an orientation of the motion signals based upon switching between the mouse mode and the cellular telephone mode.

15. The mobile communications device of claim 14, wherein said signal processor is switchable between the mouse mode and the cellular telephone mode based upon said navigation pad.

16. The mobile communications device of claim 14, further comprising a device orientation sensor coupled to said signal processor, and wherein said signal processor switches between the mouse mode and the cellular telephone mode based upon said device orientation sensor.

17. The mobile communications device of claim 15, further comprising a light detector coupled to said signal processor, and wherein said signal processor switches between the mouse mode and the cellular telephone mode based upon said light detector.

18. A mobile communications device configured to operate in a device mode and operate as a pointing device in a mouse mode for a computer, and comprising:
    a housing;
    a display carried by a front surface of said housing;
    a keypad carried by a front surface of said housing;
    a low friction projection positioned on the front surface of said housing at an end opposite said display, said low friction projection protruding outwardly therefrom farther than said keypad to inhibit the keypad from contacting a mouse surface during use of the mobile communications device with the front surface down in the mouse mode;
a navigation pad carried by the front surface of said housing and protruding outwardly therefrom farther than said keypad and said low friction projection, and configured to selectively operate as a device pointer during contact with a finger in the device mode, and as a computer pointer during contact with the mouse surface in the mouse mode;
an antenna carried by said housing; and
a signal processor carried by said housing and configured to
detect motion of the mobile communications device in the mouse mode via said navigation pad in contact with the mouse surface and encode motion signals based thereupon,
detect pressure applied to said navigation pad and encode mouse click signals based thereupon, and
transmit the encoded motion signals and the mouse click signals to the computer.

19. The mobile communications device of claim 18, wherein a mobile device center of gravity is between said low friction projection and said navigation pad.

20. The mobile communications device of claim 18, further comprising at least one switch element carried by said housing and coupled to said signal processor to receive mouse commands.

21. The mobile communications device of claim 20, wherein said at least one switch element comprises at least one of a micro switch and a snap action switch.

22. The mobile communications device of claim 20, wherein said at least one switch element comprises a touch pad switch coupled to said signal processor; and wherein said signal processor encodes a mouse command signal based upon detected pressure applied to said touch pad, and transmits the mouse command signal to the computer.

23. A communications system comprising:
a computer comprising a computer processor and a display coupled thereto; and
a mobile communications device configured to operate in a device mode and operate as a pointing device in a mouse mode for the computer comprising
a housing,
a display carried by a front surface of said housing,
a keypad carried by a front surface of said housing,
a low friction projection positioned on the front surface of said housing at an end opposite said display, said low friction projection protruding outwardly therefrom farther than said keypad to inhibit the keypad from contacting a mouse surface during use of the mobile communications device with the front surface down in the mouse mode,
a navigation pad carried by the front surface of said housing and protruding outwardly therefrom farther than said keypad and said low friction projection, and configured to selectively operate as a device pointer during contact with a finger in the device mode, and as a computer pointer during contact with the mouse surface in the mouse mode,
an antenna carried by said housing, and
a signal processor carried by said housing and configured to
detect motion of the mobile communications device in the mouse mode via said navigation pad in contact with the mouse surface and encode motion signals based thereupon, and
transmit the encoded motion signals to the computer via said antenna;
said computer processor configured to display a cursor on said display based upon the encoded motion signals.

24. A method of controlling a cursor on a display of a computer with a mobile wireless communications device configured to operate in a device mode and operate as a pointing device in a mouse mode for the computer, and comprising a housing, a display carried by a front surface of the housing, a keypad carried by a front surface of the housing, a low friction projection positioned on the front surface of the housing at an end opposite the display, the low friction projection protruding outwardly therefrom farther than the keypad to inhibit the keypad from contacting a mouse surface during use of the mobile communications device in the mouse mode, a navigation pad carried by the front surface of the housing and protruding outwardly therefrom farther than the keypad and the low friction projection and configured to selectively operate as a device pointer during contact with a finger in the device mode, and as a computer pointer during contact with the mouse surface in the mouse mode, an antenna carried by the housing, and a signal processor carried by the housing, the method comprising:
positioning the mobile wireless communications device with the front surface down in the mouse mode so that the low friction projection and the navigation pad are in contact with the mouse surface; and
operating the signal processor for
detecting motion of the mobile communications device in the mouse mode via said navigation pad in contact with the mouse surface and encoding motion signals based thereupon; and
transmitting the motion signals to the computer via the antenna.

25. The method of claim 24, further comprising detecting pressure applied to the navigation pad and encoding a mouse click signal based thereupon, using the signal processor, and transmitting the mouse click signal to the computer via the antenna.

26. The method of claim 24, further comprising detecting pressure applied to a touch pad pressure sensitive switch and encoding a mouse command signal based thereupon, using the signal processor, and transmitting the mouse command signal to the computer via the antenna.

\* \* \* \* \*